Nov. 4, 1969   R. I. MARKEY   3,476,009
SPRING WASHER
Filed April 28, 1967   3 Sheets-Sheet 1
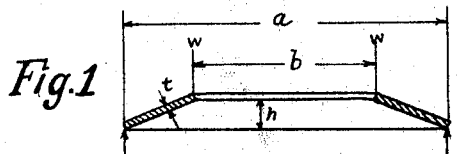
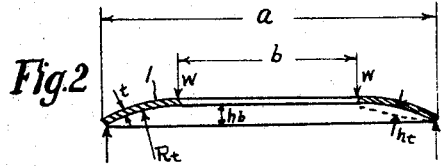
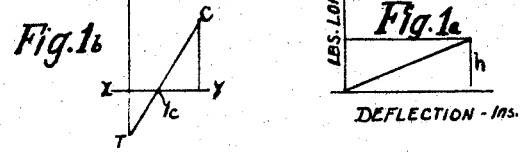
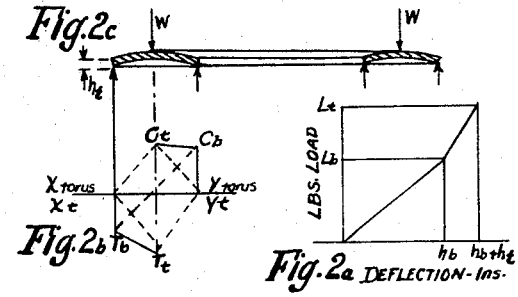
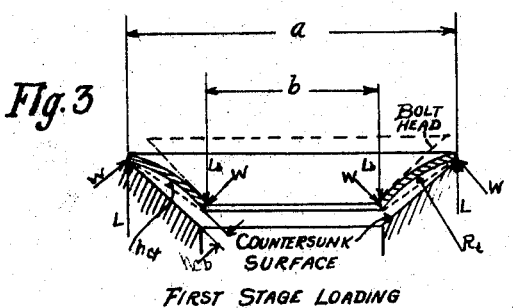
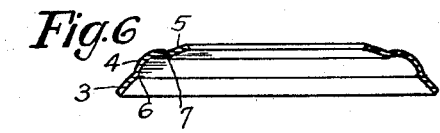
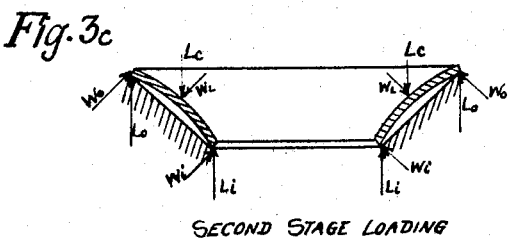
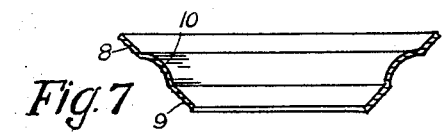
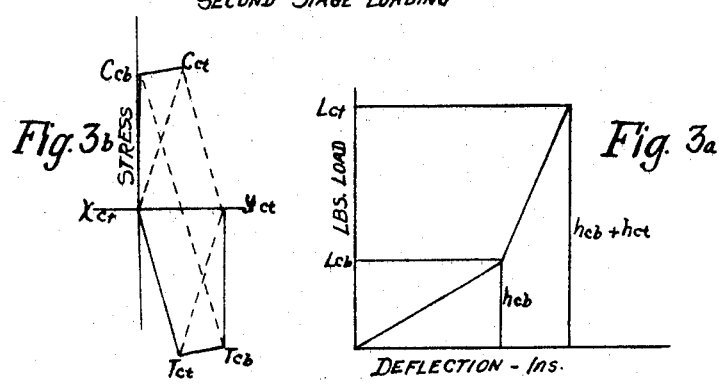
STRESS DISTRIBUTION DIAGRAM
INVENTOR.
ROSCE I. MARKEY

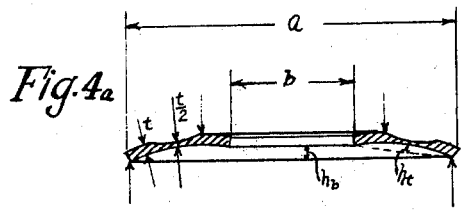
Fig.4a
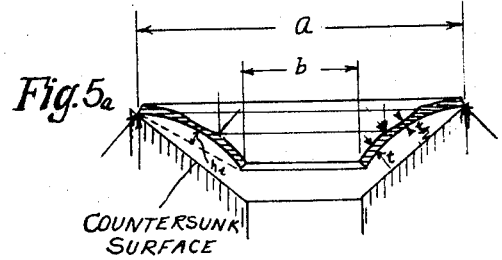
Fig.5a
COUNTERSUNK SURFACE
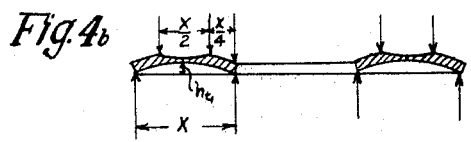
Fig.4b
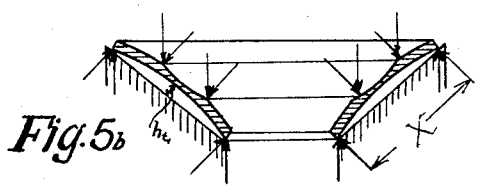
Fig.5b
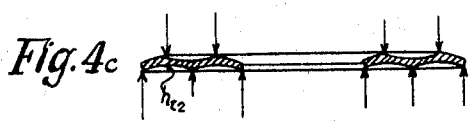
Fig.4c
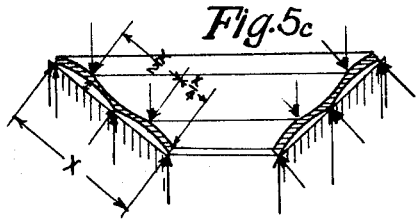
Fig.5c
Fig.4d
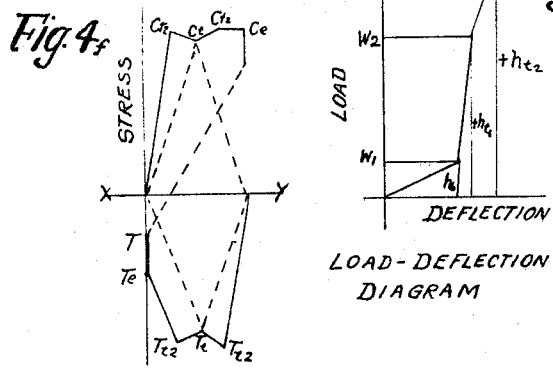
Fig.4f
STRESS DISTRIBUTION DIAGRAM
Fig.4e
LOAD-DEFLECTION DIAGRAM
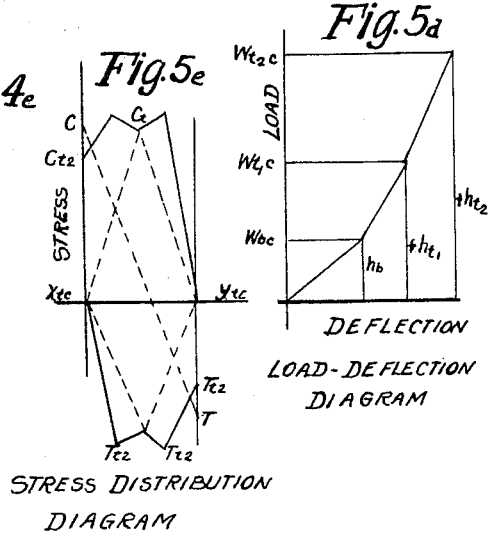
Fig.5e
STRESS DISTRIBUTION DIAGRAM
Fig.5d
LOAD-DEFLECTION DIAGRAM
INVENTOR.
ROSCE I. MARKEY Nov. 4, 1969 R. I. MARKEY 3,476,009
SPRING WASHER
Filed April 28, 1967 3 Sheets-Sheet 3

INVENTOR.
ROSCE I MARKEY

United States Patent Office 3,476,009
Patented Nov. 4, 1969

3,476,009
SPRING WASHER
Roscoe I. Markey, Charlottesville, Va., assignor to
Teledyne, Inc., Hawthorne, Calif.
Filed Apr. 28, 1967, Ser. No. 634,528
Int. Cl. F16b 31/02, 43/00, 39/22
U.S. Cl. 85—62                                    1 Claim

ABSTRACT OF THE DISCLOSURE

An elastic load supporting washer of generally frusto-conical shape having inner and outer surfaces of undulated configuration comprising radiused annular sections, wherein at maximum load the maximum critical stress on the washer is near but less than its limit stress for maximum load/weight ratio.

---

This invention relates to washers for use with bolts, screws and the like.

Prior washers have had many weaknesses. For instance, split washers are compressed flat at loads considerably below the working axial load of bolts or screws in a fixed joint. When the load on a washer is within the elastic range it is too small to maintain a fixed joint with the normal coefficients of friction existing on the clamped faces. In this case, when the clamped pieces are subjected to opposite and alternating loads they slip and put the bolt or screw in shear. Continued vibration makes the joint progressively looser until it falls apart. Barbed split washers tilt the bolt or screw head or nut. This introduces bending stresses which augment the tensile stresses from the axial load and the shear stresses from the installation torque which remains in the shank as long as the joint is tight. Thus the joint is weakened and often the head or the nut pops off in service.

Barbed washers dig into the surface and precipitate corrosion. When the torque is reversed through a small angle during a tightening operation, the ends are pulled apart, producing a fracture on the inner side. When tightening torque is then applied, the ends are brought together and the joint looks satisfactory because the partial fracture on the inner side is not visible. When this joint is subjected to severe vibration the fracture in the washer is completed and the two halves of the washer vibrate out, making the joint very loose. Continued vibration can disintegrate the joint.

Notches on the edges of washers are stress risers where fractures often start. This is especially the case when the notches are in the high-stressed locations. Sharp radial barbs are usually too short to provide any effective deflection without excessive stresses or digging into the clamped surfaces.

This washer lacks flexibility and, with a slight temperature change which shrinks the clamped material more than the bolt or screw shank, the pressure is reduced at the contact points. When this pressure is reduced to zero and the joint is subjected to vibration, the mass of the washer wears the metal away from the contact points. Continued vibration can cause the washer to be loose at all temperatures. The joint is then no longer fixed and it can soon disintegrate.

Straight section plain conical washers compressed flat at installation before the working axial load of the bolt or screw is applied, serve as any flat solid washer with no elasticity. In this case the joint elasticity for tightness must come from the axial elasticity of the shank of the bolt or screw or from the compressibility of the clamped material. When the load is reduced to be within the elastic range of the washer and this axial load is insufficient, with the coefficients of friction of the faying surfaces of the clamped parts subjected to vibration, the joint soon wears, increasing the looseness with time.

The use of so-called self-locking nuts does not contribute reliability to a fixed joint subjected to severe vibration, even if the nut does not back off of the bolt or screw shank. When the axial pressure on the clamped parts is lost the joint is no longer fixed and continued vibration produces wear. This increases the amplitude of movement of the vibrated masses which increases the pounding force so that fractures can start in the clamped parts to disintegrate the joint, even when the nut and bolt or screw remain as one assembly. Short bolts and screws can provide very small elastic ranges with their elongation under axial load.

When this range is less than Z (see table of nomenclature) the shank is overstressed or stretched at one temperature and at another extreme temperature all of the axial elasticity may be gone so that the joint is no longer fixed. Continued vibration can produce a failure. The value Z is a length unit and is the product of the differences in the coefficient of expansion of the clamped material in the shank of the bolt or screw, the axial length of the shank or the thickness of the clamped material, and the degree of change in temperature.

In order to maintain reliability of a fixed joint subjected to vibration, and shock and reversing loads, it is paramount to maintain continued sufficient axial load, with the available coefficients of friction on the faces of the clamped material, to prevent relative movement of the parts.

It is an object of my invention to eliminate faults or weaknesses of present spring washers used for fixed bolted joints. The words "bolt" and "screw" will be used interchangeably so that if one is mentioned the other is to be included likewise.

Another object is to provide a washer which will maintain reliability of a fixed joint subjected to vibration, and to produce a washer configuration which can be stress-strain analyzed to provide a required load deflection range.

A further object is to position metal in a washer so that, under a maximum design compressive load, it is not stressed beyond its elastic limit; and to produce a spring washer which has a load deflection range within its elastic limit that will cover the working axial load of the bolt or screw.

An additional object is to provide a novel spring washer in which one set of stresses reduces another set of stresses, to produce a more uniform distribution of stresses throughout all of the material in the washer.

Another object is to provide a spring washer which has no material which is not working at a fairly high design stress, and to provide a washer which requires a substantial load, per unit of mass, to flatten it.

A still further object is to provide a washer which is compressed by a load in stages throughout its load deflection range, i.e. the slope of the load deflection curve is small at the start of loading and is quite steep near the maximum load.

Other objects are to create a spring washer which limits the amplitude of the supported mass in its load working range; to create a spring washer which has reserve expansion and medium load supporting capacity after it has shed its high duty load; to create a spring washer which will provide the same reliable continuous axial loading for countersunk head bolts or screws as can be provided for raised head bolts or screws.

Additional objects are to provide stress balanced spring washers, and to create a spring washer which has a small torque radius at the contact point of the bolt head and washer and a large torque radius between the washer and clamped material at the start of loading.

Other objects are to provide a spring washer which has a plurality of stages of load deflection or, a series of spring rates, with each successive rate greater than the preceding spring rate, as the load increases.

Other objects will be evident in the following specification.

In the drawings:

FIGURE 1 is a diametral sectional view of a frusto-conical washer of prior design, commonly called a "Belleville" washer. I shall refer to it as a "conical" washer.

FIGURE 1a is a load-deflection diagram for the washer shown in FIGURE 1.

FIGURE 1b is a stress distribution diagram for the washer shown in FIGURE 1.

FIGURE 2 is a diametral section of my improved washer which I call a "torus sector spring washer" or a "toroid" washer.

FIGURE 2a is a load-deflection diagram of my washer shown in FIGURE 2.

FIGURE 2b is a stress distribution diagram for my improved washer shown in FIGURE 2, under fully loaded conditions.

FIGURE 2c shows the washer of FIGURE 2 under compression.

FIGURE 3 is a diametral sectional view of my improved countersunk type washer under no-load conditions.

FIGURE 3a is a load-deflection diagram for the washer shown in FIGURE 3.

FIGURE 3b is a stress distribution diagram for the washer shown in FIGURE 3 under fully loaded conditions.

FIGURE 3c is a diametral sectional view of the washer of FIGURE 3 under the second stage of loading, with both upper and lower peripheral edges being in contact with a countersunk surface.

FIGURE 4a is a diametral sectional view of a modification of my improved washer shown in FIGURE 2; under no-load conditions.

FIGURE 4b shows the washer of FIGURE 4a under a first stage of loading.

FIGURE 4c shows the washer of FIGURE 4a under a further stage of increased loading.

FIGURE 4d is a diametral sectional view of the washer of FIGURE 4a under fully loaded condition with the bottom surface almost flat against a supporting surface.

FIGURE 4e is a load-deflection diagram for the washer shown in FIGURE 4a.

FIGURE 4f is a stress distribution diagram for the washer shown in FIGURE 4a under fully loaded conditions.

FIGURE 5a is a diametral sectional view of a modification of my countersunk type washer shown in FIGURE 3, under no load conditions.

FIGURE 5b shows the washer of FIGURE 5a under a first stage of loading.

FIGURE 5c shows the washer of FIGURE 5a under an increased loading.

FIGURE 5d is a load-deflection diagram for the washer shown in FIGURE 5a.

FIGURE 5e is a stress distribution diagram for the washer of FIGURE 5a when fully loaded.

FIGURE 6 is a sectional elevation of a washer generally similar to the washer shown in FIGURE 4a but being of uniform thickness.

FIGURE 7 is a sectional elevation of a washer generally similar to the washer of FIGURE 5a but having uniform thickness.

Figure 8:
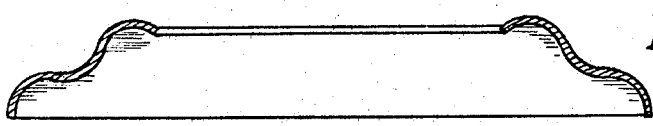
FIGURE 8 is a mid-sectional elevation of an undulating or wavy type washer of uniform thickness.

The washer shown in FIGURE 1 represents the familiar Belleville washer having the load-deflection characteristics shown in FIGURE 1a and having a stress distribution diagram as shown in FIGURE 1b. In FIGURE 1a the ordinates represent load in pounds and the abscissas represent horizontal positions along the X-axis for circles around the washer and ordinates represent stresses at the various positions or circles, in pounds. It is assumed that the washer is compressed between flat surfaces such as between the head of a bolt or screw and an adjacent surface to be clamped to another object. The same shown in FIGURES 2c, 4b, 4c, and 4d. In FIGURES 3c, 5b, and 5c it is assumed that a frusto-conical bolt head or screw head presses the washer against a generally conical countersunk surface.

FIGURE 1a shows that there is virtually a straight line relationship betwen load and deflection, for the Belleville or conical washer. The rate of deflection with increasing load is practically constant. FIGURE 1b shows that maximum compression occurs at the inner circle of the washer and the maximum tension occurs at the outer circle or periphery of the washer, the stress going through a zero point along the circle 1c. The outer diameter of the washer is represented by $a$, the inner diameter by $b$, the thickness by $t$, the inner height by $h$, and the load by $w$.

In my improved washer shown in FIGURE 2 the washer 1 is of curved contour instead of being truly of conical configuration as in FIGURE 1. The washers shown in the various figures are illustrated as having sharp edges whereas, in actual practice, the edges are preferably rounded.

Elastic performance

Elastic performance refers to the load deflection characteristics which show the kinetic energy storing capability. This energy in inch pound units can be shown by load deflection graphs as shown in FIGS. 1a, 2a, 3a, 4e, and 5d. Inch (usually in thousandths) values are shown horizontally. Pound units are shown on the vertical scale. A product of the two represents in lb. kinetic energy. These graphs are shown on the right in each figure. It is obvious that the area between the base line and the load deflection line is larger for FIGS. 2, 3, 4, and 5 than it is for FIG. 1. Load deflection tests substantiate the theory.

Stress distribution

Stress distribution graphs show the magnitude, location and type of stress as represented on the left side of FIGS. 1b, 2b, 3b, 4f, and 5e. Compressive stresses are represented above the base line X and Y and tensile stresses are presented below the base line. These clearly show the following:

(I) In the well known conical washer represented by FIG. 1, there are two point of inefficiency, such as: (a) the maximum stresses occur at the edges which is the normal place for fractures to start from nicks in the edges; (b), there is a large portion of the washer material near the central area which is working at zero or very low stress. Since a portion of the metal is not working at high stress, the average stress per unit of mass of the washer is low. Therefore FIG. 1 type washer is inefficient. To eliminate this inefficiency I have created several types as represented by FIGS. 2, 3, 4, 5, 6, 7, and 8.

(II) Referring to FIG. 2a: The load deflection graph shows two stages. The first stage is compressing $h_b$ to zero. The stresses developed during this stage are, $T_b$, tension at the outer portion and compression $C_b$ at the inner portion. This is shown by the FIG. 2b graph $X_t$ $T_b$ $C_b$ $Y_t$. It will be noted that this is similar to X T C Y in FIG. 1b. The area in these two pairs of triangles is small. However, that is all that can be gotten from a FIG. 1 type washer. The second stage of deflection, shown on the right, FIG. 2a by $h_b$ to $h_b+h_t$, occurs when $h_t$, the no load torus crown height, is reduced. The stresses developed are shown by the dashed lines on the left side of FIG. 2b. The triangle $X_t\ C_t\ Y_t$ shows the compression.

The triangle $Y_t\ T_t\ X_t$ shows the tension to be in the same magnitude as the compression stress, but on the concave side of the torus sector. Now the final stresses shown by the solid lines encompass both of these trianguar shaped graphs and are represented in FIG. 2b by, $X_t\ C_t\ C_b\ Y_t\ T_t\ T_b\ X_t$. This graph shows that all of the metal in the washer is working at high stresses. That makes the torus design efficient for load carrying capacity. To produce these stresses the load deflection capacity must be greater than that in washers represented by FIG. 1. This more efficient washer has greater load carrying capacity per unit of mass of washer. This represents the basic feature of my invention for washers to replace those shown by FIG. 1.

Another unique feature of my invention is that the maximum stresses are not at the edges of the washer but occur at the center area between the inner and outer edges. Fractures seldom if ever start in this area. Therefore my torus washer, FIGS. 2 and 4 can be used at higher stresses with less danger of fractures developing. It is obvious that the area within the envelope diagram is considerably larger than that within the two triangles shown by the dotted line $T_b\ C_b$ of FIG. 2b.

Another very unique feature of my torus washer is that it embodies balanced stresses i.e. one set of stresses reduces the maximum primary or hoop stresses. This is explained as follows: I shall refer to the first stage stresses as hoop stresses. The compressive stress $C_b$ exerts a radial force toward the outer edge while the tensile stress $T_b$ exerts a radial force toward the inner edge. These opposing forces near the central area reduce the radial tensile stresses developed by the beam loading action on all radial sections. The magnitude of this radial force is similar to the internal pressure in a tube as shown by the following Equation 5. These radial forces also increase the compressive stress in the central area. However, no failures can occur from this compressive stress.

The only logical explanation for this very small permanent set follows: As the load is removed, the hoop stresses apply opposing radial forces which return the torus no load crown height $h_t$ to practically its original dimension. This is the case where one set of stresses remove another set of stresses during the unloading. This is another unique feature of my invention. Thus, this balanced stress design not only reduces the maximum stresses but it reshapes the part subjected to stresses that are beyond the normal yield strength of the material. All of these stresses are controllable by design dimensions. Equations have been developed for this work.

(III) Referring to FIG. 3, it will be noted that the load deflection diagram on the right, FIG. 3a, is quite similar to that in FIG. 2a and similar comments apply. However, the stress diagram on the left, FIG. 3b, differs from that in FIG. 2b, as follows: In this design the outer edge is subjected to compressive stresses and the inner edge is subjected to tensile stresses, which is opposite to that in FIG. 2b. The first stage deflection to $h_b$, produces $T_{cb}$ tensile stresses at the inner edge and $C_{cb}$ compressive stresses at the outer edge. These stresses are produced by a rolling action of all sections of the washer as represented by the Equations 4, 6, 7, etc. The dotted line, FIG. 3b, connecting these two points $T_{cb}$ and $C_{cb}$ describe two triangles representing the distribution of stresses in this first stage of deflection. The area in these two triangles is a small part of the area in the final stress polygon. When $h_{cb}$ reaches zero, the inner edge is supported by the countersunk hole. During the deflection of $h_{cb}$ the bolt or screw head shifts its load from the inner edge to a circle which is substantially near the central area between the inner and outer edges. Further loading from the bolt or screw head reduces $h_{ct}$. During this second stage of deflection, $h_{ct}$, the following stresses are produced (FIG. 3b): $C_{ct}$ represents the compression on the convex side of the torus sector. On the opposite side of the washer $T_{ct}$, tension of equal magnitude is developed.

The combination of the two sets of stresses, from the two stage deflection, is represented by the stress polygon $X_{ct}C_{cb}C_{ct}Y_{ct}T_{cb}T_{ct}X_{ct}$. The increase in this stress polygon area and the increase in the load capacity is all due to the unique use of the torus sector represented by $h_{ct}$, (FIG. 3). All of the unique features explained for FIG. 2 are applicable to FIG. 3. An additional unique feature of balanced stresses, is an outstanding advantage. This highly desirable feature is explained as follows: While $h_{ct}$ is reduced on the conical slope of the countersunk hole, metal is moved toward the inner and the outer edges as the radial sections are flattened by beam action deflection. This means that the tension stresses at the inner edge are reduced and the compression stresses at the outer edge are reduced, see Equations 13 and 14. Thus, in FIG. 3 type torus washers there is a three point action of stress reduction, namely at the inner and outer edges and at the central area on the tension side, i.e. the concave side of the torus sector.

Controlling dynamic energy

The reliability of a fixed screw joint involves not only the balance of stresses to support large loads with little washer mass but involves the control of this elastically supported mass when subjected to vibration. The critical frequency of this supported mass must not produce harmonics with the inducing vibrating force. If it did the supported mass would severely pound the joint. Therefore, the deflection of the elastically supported mass must be controlled to a small distance. In this way the frequency of the supported mass can be kept above the frequency of the inducing vibrating force. This is accomplished with my washers by designing $h_t$ to be just large enough to encompass Z the difference in the expansion of the clamped material and the expansion of the bolt or screw shank, when the washer is subjected to service loads. A service load may exceed the installation load, $L_a$.

When $h_t$ does not have a margin on the dimensional change in a wide temperature range then the shank of the bolt or screw will be stretched beyond the yield point. This dangerous stretching is practically eliminated when $h_t$ will be further reduced without becoming zero or the load completely flattens the washer. Thus with a small part of $h_t$ always remaining the increase in $L_a$ is within the load deflection range of the washer. When that is known the designer can keep the stresses within safe limits at all known temperature ranges.

When $h_t$ just encompasses Z the expansion differences between clamped and clamping material (the bolt/screw shank), there is little or no danger of the elastically supported mass pounding the joint. That is why the slope of the load deflection curves from $h_b$ to $h_b+h_t$ in FIGS. 2, 3, 4, and 5 is very steep. However, this is not as steep as the slope of stretching bolt/screw. Thus my washers not only prevent self destruction of the joint by supported mass pounding, but they also prevent the bolt or screw from being severely stretched by overloads in service or from temperature changes. These are the main two ways in which my washers increase the reliability of fixed screw joints.

Maintaining joint fixity—for reliability

My improved torus washers are superior to prior washers because they elastically support the design load, $L_a$. By design, this load and the coefficient of friction between the clamped parts is ample to prevent slippage. Tests have proved that two or more pieces subjected to opposite and alternating loads can be rigidized better by axial loading than by shear loading of the bolts or screws. Present spring washers are clamped solid because they will not support the load $L_a$. Therefore, when a greater load is applied in service or by a temperature change, the shank is stretched. At the opposite temperature range limit, the clamped material shrinks, which loosens the joint.

With alternating loads as described, or by vibration, the joint can disintegrate. Such joint failures are prevented by the use of my torus type washers. Another advantage my washers provide, is to keep the nut from backing off. It is well known that when the load, $L_a$, is applied to the nut or shank threads, the usual coefficient of friction of about 0.2 or more is ample to prevent the nut from backing off or the screw from backing out of a tapped hole. Since my torus washers support the load, $L_a$, throughout, my torus washers eliminate the need for deformed or so-called self-locking nuts which seize to the shank and either the nut or the shank or both are ruined when torque-forced apart. This difficulty is eliminated when my washers are used.

Improvements over prior art

The common conical washer has straight radial sections and is usually called a Belleville washer. For this washer, stress, load and deflection equations and factors are given in various references. My improvement embodies the use of a washer which represents a sector cut from a torus shell. The size of the torus section radius and its location on the forming tools will vary with the spring-back of the material. In the final heat treated washer the size and location of the torus section radius is a function of the ratio of the washer thickness and working stress. i.e. $h_t$ (see diagrams) will be made as large as possible and kept within safe margins of the yield strength on the material. The equations show the correlations of the washer dimensions and the critical stresses for the 8 modifications. The equations have been prepared to permit an engineer to design a torus washer for any size bolt or screw and made from his chosen material with known physical characteristics. The improvements, explained under stress distribution, are basically the design and control of stresses, with particular dimensions, to keep the peak stresses within a safer working limit in order to support the maximum load per unit of washer mass. This feature is required on assemblies where space and weight are paramount.

This is a basic requirement for all air-space material or any place where maximum performance with maximum reliability and minimum weight is important. These torus sector washers can replace plain, split, notched (or star) or other spring washer in fixed joints. The present largest load supporting washer is the conical FIG. 1 type. My improved torus washer (FIG. 2) will support from 7 to 9 times as much load as FIG. 1 conventional washers of the same thickness, screw size, and outside diameter. This ratio is much higher for the washers shown in FIGS. 4 thru 9.

FIGURE 6 has outer annular area 3 generated by sweeping a curved line through 360 degrees about the axis, and a similarly generated annular area 5. The convex annular area 4 of shorter radius of curvature is generated similarly. This area joins areas 4 and 5. Under load this washer first goes through a Belleville range with circles 6 and 7 touching a surface. Then the curved areas 3, 4, and 5 flatten out under sufficient further load. This washer is of uniform thickness and there may be a plurality of annular areas similar to area 4.

The funnel-like washer shown in FIGURE 7 is also of uniform thickness and has annular areas 8 and 9 joined by more sharply curved annular area which may be curved as shown or reversely curved, as desired. The operation, under load, is similar to the described operation of the washer of FIGURE 6. A desirable advantage of washers of uniform thickness is that they may be more easily manufactured than washers of non-uniform thickness.

In FIGURE 8 the washer is of wavy or undulating type as illustrated. This washer can be substituted generally, for the washer shown in FIGURE 4a. In the washer of FIGURE 8 the thickness is uniform instead of varying as in FIG. 4a.

The wavy type washer of uniform thickness is much easier to manufacture, however, as it may be stamped out of a sheet of metal of uniform thickness. The undulating washer will go through several stages of compression, as described for the washer of FIG. 4a.

Figure 9:
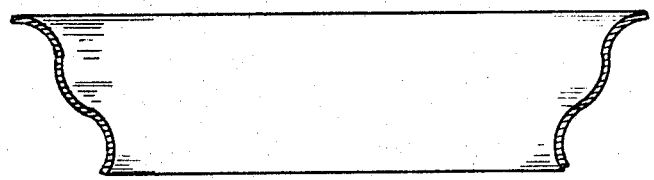
FIGURE 9 is a mid-sectional elevation of a wavy or undulating type of washer of uniform thickness and suitable for use in countersunk holes.

The undulating washer shown in FIGURE 9 acts under compression very similarly to the washer shown in FIG. 5a, and goes through several stages as described. The washer of FIG. 9 is intended for use in countersunk holes. Again, this washer of uniform thickness is easier to manufacture than the washer shown in FIG. 5a.

Stress-strain design and control

The published load and stress equations for, straight conical (Belleville) washers shown in FIG. 1 contain a number of factors which vary with the ratio of $a/b$, the O.D./the I.D. One source published a mathematical analysis showing that the best ratio of $a/b$ is 1.7 for maximum energy absorption per unit of washer mass. Another source published similar data based on analysis and test showing that the best ratio was 1.8. I believe that for this service the best ratio is 1.85 for good load distribution to the clamped material in high duty compact assemblies where space is critical and high loads on controlled deflection are required for the washers. As this ratio is increased, deflection is increased and the maximum load to flatten the FIG. 1 type washer is reduced. When this ratio exceeds 2.4 the effect of the stress-reducing factor diminishes rapidly, as shown by published data. These equations also embody Poisson's ratio. This value is about 0.3 for most metals suitable for washers.

Using the factors, applicable to a ratio of $a/b=1.85$ and the above average Poisson's ratio, permits simplification of the rather complex equations for FIG. 1 type washers as shown in the following equations:

Calculate "$t$" for the maximum compressive stress at the top inner edge of FIG. 1 washer with Equation 1. See nomenclature for letter identification.

$$t=\sqrt{f_c a^2/C_c E}, \text{ in.} \quad (1)$$

Calculate "$t$" for the maximum tensile stress at the lower outer edge of the FIG. 1 washer with Equation 2.

$$t=\sqrt{f_t a^2/C_t E}, \text{ in.} \quad (2)$$

Calculate the load to flatten the FIG. 1 washer with Equation 3.

$$W=C_w E t^4/a^2, \text{ lb.} \quad (3)$$

Equations 1, 2 and 3 apply to washers shown in FIG. 1 when the load is applied at the inner and outer edges and the no-load height $h$ is reduced to nearly zero. See nomenclature for the substitution for the letters in calculating "$t$". Equation 2 is probably the most convenient, because the yield strength in tension is usually known for the material. If the yield strength in compression is known and Equation 1 is used to calculate the thickness "$t$", it may be smaller and in a washer made in accordance with Equation 1 "$t$" will be weaker as shown by Equation 3. If the washer is made according to Equation 2 "$t$" and loaded to the "$W$" value in Equation 3, the maximum compressive stress occurring near the top inner edge will exceed the yield strength. This is not a serious problem because the calculated maximum compressive stress is limited to a very small area. There is no danger of fractures in the compression area. When the load is removed, the permanent set or reduction of "$h$" may be negligible due to the small area affected by the maximum compressive stress. Equation 2 is considered the safest to use because it avoids exceeding the yield strength in the tension area where fractures might develop when the yield strength is exceeded.

Equations 4 and 5 apply to FIG. 2 torus sector type washers.

Calculate "$t$" to support the required load $W$ with Equation 4.

$$t = \sqrt{C_b W / f_{tco}} \quad (4)$$

Using the largest $C_b$ value will give the thickest, strongest and stiffest washer especially in the $h_t$ range, and vice versa when the smaller $C_b$ values are used. Since $f_t$, Equation 2, (designed to be 0.95 $F_{ty}$) produces a compressive stress on the $D_m$ circle, $f_{tco}$, Equation 4, should be increased by $P$ (p.s.i.) from Equation 5.

$$P = \frac{2 \times 0.95 F_{ty}}{(a^2 + D_m^2)/(a^2 - D_m^2)}, \text{ p.s.i.} \quad (5)$$

This is similar to hydrostatic pressure in a heavy walled tube with an I.D.=$D_m$ and an O.D.=$a$. Then $P$ (p.s.i.) produces a tensile stress=$0.95 F_{ty}$.

Calculate the maximum depth of the concave arc on a radial section of the torus sector with Equation 6.

$$h_t = C \Delta a^2 W / E t^3, \text{ in.} \quad (6)$$

Using the largest $C\Delta$ factor is considered practical because $W$ is based upon the maximum axial load applied by the bolt or screw. Furthermore, overstressing the metal in the center of the torus sector is not only improbable but if it occurred, it is not likely to precipitate a fracture in the center of that area. Also the tensile stresses are reduced by the primary hoop stresses shown by Equation 5.

Select $h_b$ as 0.5 $t$. Use the appropriate $C_t$ in Equation 2, with "$t$" from Equation 4 and calculate $f_t$. If this exceeds $F_{ty}$ 0.95, $h$ should be reduced.

Refer to FIG. 3 with the following calculations.

Calculate "$t$" with Equation 4. See nomenclature for the proper evaluation of the letters for the FIG. 3 washer.

Calculate the total distance the bolt or screw head sinks into the countersunk hole, within the elastic range of the material in the washer with Equation 7.

$$y_{tot} = y_i + y_o + y_t = (1 + 2.4) bf/E + h_t/\sin(\theta_h°/2) \quad (7)$$

See nomenclature for the evaluation of the letters. "$f$" in Equation 7 refers to tension at the inner edge and compression at the outer edge. In solving Equation 7 "$f$" should be replaced by $F_{ty}$ 0.95. This allows a 5% margin on the material strength. This margin should be increased by using a value less than 0.95 if tension fractures develop in the inner edge of the washer. Such a fracture will not cause a catastrophic failure, i.e. shed all of its elastically supported load because only $y_i$ will be lost. The other two will still react against the bolt/screw head tending to force it out of the countersunk hole. The inner diameter stretches, $2[\sin \theta_h°/2)^2]y$, which=$y$; for a 90° bolt or screw head. $E$ (in./in.) stretch=$f_t$ and $E$ (in./in.) compression=$f_c$:

In the elastic range, $$Ey/b = f_t \quad (8)$$

Equation 8 explains Equations 9 and 10.

$$y_i = 1 b f_t / E \quad (9)$$

$$y_o = 2.4 b f_c / E \quad (10)$$

$$y_t = h_t / \sin(\theta_h°/2) \quad (11)$$

Equations 9, 10, and 11 are combined in Equation 7.

Calculate $h_t$ with Equation 6. See nomenclature for $W$ and FIGURE 3.

Calculate $h_b$ with Equation 12.

$$h_b = y_i \sin(\theta_h°/2) \quad (12)$$

Should load $W$ reduce $h_t$ to zero, the tensile stress at the inner edge is reduced by a compression stress from Equation 13 and the compression stress at the outer edge is reduced by a tension stress from Equation 14.

$$f_{oht} = \frac{E2}{b}(\sqrt{h_t^2 + (X/2)^2} - X/2), \sin(\theta_h°/2), \text{ p.s.i. comp.} \quad (13)$$

$$f_{toht} = \frac{E2}{a}(\sqrt{h_t^2 + (X/2)^2} - X/2) \sin(\theta_h°/2) \text{ p.s.i., tension} \quad (14)$$

Scope of washer adaptation

It should be obvious that the washer shown in FIG. 2 may have the convex side next to the bolt or screw head or next to the clamped surface. The washer shown in FIG. 3 has the convex side next to the bolt or screw. However, it may be made for the convex side to be next to the countersunk hole without departing from the principle of this invention.

This invention also includes a slight modification of the die contour to form a washer as shown in FIGURES 4 and 5. These designs have a still larger supported load/washer weight ratio than that shown in FIGURES 2 and 3. The washer in FIG. 4 may have the two points, spaced $X$ distance apart, adjacent to the clamped material or the bolt or screw head or the nut. Likewise the washer shown in FIG. 5 may have the two rings spaced $X$ distance apart next to the countersunk hole or the washer may be formed with the two contact circles, $X$ distance apart, adjacent to the bolt/screw head without departing from the scope of this invention.

Torus washers shown in FIG. 4 may be designed with the following equations: The total load supported is shown by Equation 15.

$$W_{total} = W_1 + W_2 + W_3 = 25.82 b f t^2 / X, \text{ lb.} \quad (15)$$

Load to reduce $h_b$ to zero is;

$$W_1 = 1.39 D_m f t^2 / X, \text{ lb.} \quad (16)$$

Load to reduce $h_{t1}$ to zero is:

$$W_2 = 8.36 D_{mo} f t^2 / X, \text{ lb.} \quad (17)$$

Load to reduce $h_{t2}$ to zero is:

$$W_3 = 8.36 D_{mi} f t^2 / X, \text{ lb.} \quad (18)$$

Equations 16, 17 and 18 are combined in Equation 15.

Calculate $t$ with Equation 15 by letting $f$ be at least 5% less than the $F_{ty}$ of the washer material, heat treated.

Calculate $h_t$ with Equation 19. Treat $f$ as in Equation 15.

$$h_t = 0.306 f X^2 / E t, \text{ in.} \quad (19)$$

Calculate $h_{t2}$ (for information only), with Equation 20.

$$h_{t2} = 0.0833 f X^2 / E t, \text{ in.} \quad (20)$$

Calculate $h_{total}$, total movement of the bolt/screw head or nut within the elastic range of the washer.

$$h_{total} - 0.3893 f X^2 / E t, \text{ in.} \quad (21)$$

Let $h_b = 0.5 t$. Calculate $f_t$ with Equation (2). If it is greater than $F_{ty}$ 0.95, reduce $h_b$ to make it that amount, $F_{ty}$ 0.95.

Should the load $W$ reduce $h_{t2}$ to zero, the compressive stress at the top inner edge will be increased as shown by Equation 22.

$$f_{oht} = \frac{E2}{b}(\sqrt{h_t^2 + (X/2)_2} - X/2), \text{ p.s.i. comp.} \quad (22)$$

And the tensile stress at the lower outer edge will be increased by Equation 23.

$$f_{tht} = \frac{E2}{a}(\sqrt{h_t^2 + (X/2)^2} - X/2) \text{ p.s.i. tension} \quad (23)$$

FIG. 5 washers are designed with following equations:
Calculate $t$ with Equation 15, see nomenclature for $W_{total}$. Treat $f$ as before for FIG. 4.

Calculate the distance the bolt or screw head sinks into the countersunk hole with Equation 7. See notes under Equation 7. Equations 8, 9, and 10 are also applicable. But Equation 11 is replaced by Equation 24 for FIG. 5 washers.

$$y_{t2} = h_{tot}/\sin(\theta_h°/2), \text{ in.} \quad (24)$$

Make $h_t = h_{total}$ from Equation 21.
Calculate $h_b$ with Equation 12.

Should W reduce $h_t$ to zero, the tensile stress at the inner edge is reduced by a compression stress from Equation 13 and the compression stress at the outer edge is reduced by a tension stress from Equation 14.

Nomenclature $a$—in. outside diameter of washer, O.D.
$b$—in. inside diameter of washer, I.D.
$C_b$—0.149, factor from beam loading theory.
　—0.137, factor from moment loading of washer edges, theory.
　—0.1333, average factor from theory and test.
$C_c$—0.897, factor when $h$ or $h_b = 0.35\ t$.
　—1.344, factor when $h$ or $h_b = 0.5\ t$.
$C_{exb}$—in./° F in., coefficient of expansion of the bolt/screw material.
$C_{exg}$—in./° F in., coefficient of expansion of the gripped or clamped material.
$C_t$—0.5, factor when $h$ or $h_b = 0.35\ t$.
　—0.748, factor when $h$ or $h_b = 0.5\ t$.
$C_w$—0.59, factor when $h = 0.35\ t$, for FIG. 1 washers.
　—0.84, factor when $h = 0.5\ t$ for FIG. 1 washers.
　—1.18, factor when $h_b = 0.35\ t$ for FIG. 2 washers.
　—1.68, factor when $h_b = 0.5\ t$, for FIG. 2 washers.
$C\Delta$—0.00505, factor from beam loading theory.
　—0.00597, factor from moment loading of washer edges.
　—0.00455, factor, average from theory and test.
$D_m$—in mean diameter $= 1.425\ b$ when $a/b = 1.85$.
$D_{mi}$—in. mean diameter of inner half $= 1.212\ b$ when $a/b = 1.85$.
$D_{mo}$—in. mean diameter of outer half $= 1.637\ b$ when $a/b = 1.85$.
$D_o$—in. outside diameter of external threads, approximately $= b$ for stress-size relation.
E—p.s.i., tension modulus.
°$F_h$—degrees Fahrenheit, highest service temperature.
°$F_i$—degrees Fahrenheit, temperature at installation.
$F_{cy}$—p.s.i. Yield strength in compression.
$F_s$—p.s.i. Shear strength.
$F_{tu}$—p.s.i. Ultimate tensile strength.
$F_{ty}$—p.s.i. Yield strength in tension.
$f_b$—p.s.i. Bending stress in tension and or compression.
$f_c$—p.s.i. Compressive stress developed when $\Delta = h$.
$f_c$—should be replaced by $F_{cy}$ 0.95, when $t$ is calculated by Equation 1.
$f_t$—p.s.i. Tensile stress developed when $\Delta = h$.
$f_t$—should be replaced by 0.95 $F_{ty}$ when $t$ is calculated by Equation 2.
$f_{tco}$—p.s.i. Combined radial and tangential tensile stress occurring near the center of the concave arc. This should be replaced by 0.95 $F_{ty}$ when calculating $t$.

$gl$—in. Grip length or clamped thickness.
$h$—in. The inner edge is away from the plane of the outer edge at no load.
$h_b$—in. The inner edge clears the plane of the outer edge at no load.
$h_{cb}$—in. The inner edge clears a conical plane or the countersunk hole tangent to the outer edge at no load.
$h_t$—in. At no load, the maximum clearance between the concave side of the torus washer and a plane in contact with the inner and outer edges.
$h_{t2}$—in. Maximum clearance between one half of the concave side of a torus washer and a plane contacting the inner and outer edges and the central point of the concave side at load $W_2$.
I—in.⁴ Moment of inertia of a stressed section.
L—lb. Axial load.
$L_a$—lb. Axial load applied at installation. This is controlled by limit torque drivers.
$L_b$—lb. Axial load to reduce $h_b$ to zero.
$L_{cb}$—lb. Axial load to reduce $h_{cb}$ to zero.
$L_{ct}$—lb. Axial load to reduce $h_{ct}$ to its min. value or theoretical zero.
O.D.—in. outside diameter.
P—lb. Force. Or p.s.i. pressure
p.s.i.—Pounds per square inch, stress or pressure.
R—in. radius
$t$—in. thickness of washer stock.
W—lb. load normal to the washer load face.
$W = L_a$—lb. axial load from bolt/screw on FIGS. 1, 2, 4, 6 and 8 washers.
$W = L_a/\sin(\theta_h°/2)$—lb. bolt/screw normal load on FIGS. 3, 5, 7 and 9 washers.
$W_1$—lb. load normal to washer to reduce $h_b$ or $h_{cb}$ to zero.
$W_2$—lb. load normal to washer to reduce $h_t$ to zero at the center of the concave surface.
$W_3$—lb. load normal to the washer to reduce $h_{t2}$ to theoretical zero.
$W_{total}$—lb. total normal load for full deflection of FIGS. 2 thru 9 washers.
X—in. length of a radial element of a washer.
$X = 0.425\ b$ for FIGS., 1, 2, 4, 6, and 8 washers. When $a/b = 1.85$.
$X = (0.75\ \text{to}\ 0.85)b$, (depending upon the method of manufacture) for FIGS. 3, 5, 7, and 9 washers.
X-Y, Base line for stress graph.
$y$—in. axial deflection.
$y_i$—in. axial movement of the countersunk bolt/screw head from the enlargement (stretching) of the inner diameter $b$.
$y_i = bf_t/E$.
$y_o$—in. axial movement of the countersunk washer into the countersunk hole from the compressive strain (shrinking) of the outer edge.
$y_o = 2.4bf_c/E$, for a 90° countersunk head.
$y_t$—in. the countersunk bolt/screw head sinks into the washer from the deflection of $h_{ct}$ and $h_{ct2}$.
$y_t = (h_{ct/2} + h_{ct2}) \sin(\theta_h°/2)$, for FIG. 5, 7 and 9 washers.
$y_t = h_{ct} \sin(\theta_h°/2)$, for FIG. 3 washers.
Z—in. difference in bolt/screw length and thickness of clamped material at an elevated temperature.
$Z = (C_{exg} - C_{exb})(F_h - °F_1)\ gl$, in. excess of clamped material expansion over the bolt/screw length.
Δ—in deflection or dimensional change.
$\theta°_h$—degrees of the included angle of the countersunk hole and the cone angle of the bolt/screw clamping face.

What I claim is:
1. An elastic load supporting washer comprising a continuous one-piece body of generally frusto-conical configuration being formed by spring material and having a central opening therethrough, said body including first and second annular sections adjacent the respective inner and outer peripheries thereof defining convex surfaces on one face of the body and corresponding concave surfaces on the opposite face thereof; said first and second annular sections being joined together by a third annular section defining a concave surface on said one face and a corresponding convex surface on said opposite face, the cross section of each of said annular sections defining radiused sections of substantially equal radii, wherein at any point along a radial line, the material in the washer at maximum load has a combined critical stress near but less than the failing stress for the applicable type stress at said point.

References Cited

UNITED STATES PATENTS

| 1,896,650 | 2/1933 | Trotter | 151—35 |
| 1,963,535 | 6/1934 | Trotter | 151—38 |

FOREIGN PATENTS 577,082   3/1958   Italy.

RAMON S. BRITTS, Primary Examiner

U.S. Cl. X.R.

85—50; 151—38